No. 716,041. Patented Dec. 16, 1902.
P. A. HOUGHTALING.
CLUTCH.
(Application filed Aug. 13, 1902.)
(No Model.)
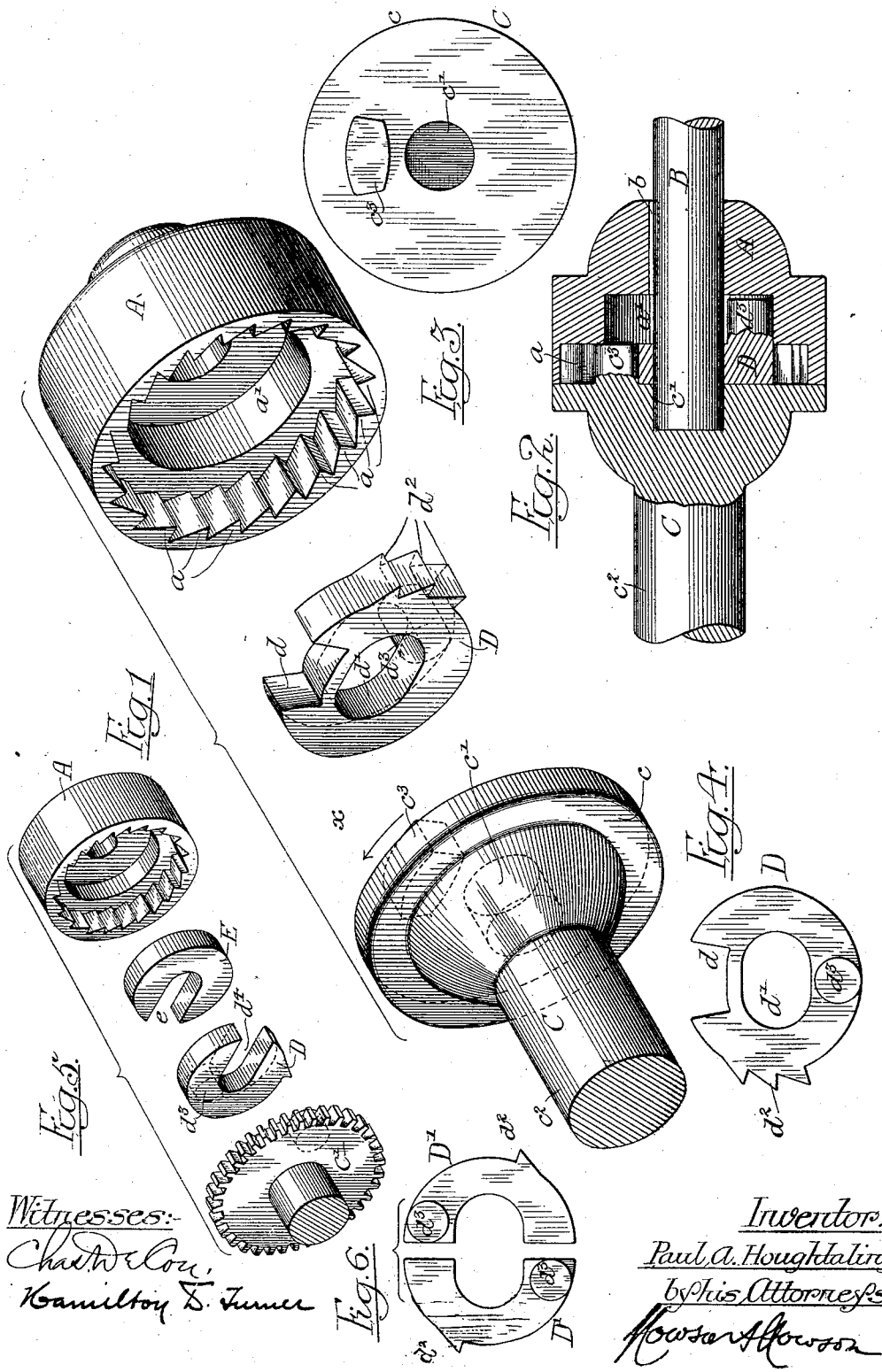
Witnesses:-
Inventor:-
Paul A. Houghtaling,
by his Attorneys;

UNITED STATES PATENT OFFICE.

PAUL A. HOUGHTALING, OF RIVERTON, NEW JERSEY.

CLUTCH.

SPECIFICATION forming part of Letters Patent No. 716,041, dated December 16, 1902.

Application filed August 13, 1902. Serial No. 119,509. (No model.)

*To all whom it may concern:*

Be it known that I, PAUL A. HOUGHTALING, a citizen of the United States, and a resident of Riverton, New Jersey, have invented certain Improvements in Clutches, of which the following is a specification.

My invention relates to certain improvements in clutches; and it consists more particularly in an improved form of ratchet-clutch, having for its object the provision of a device of the character described hereinafter, which will be reliable in action and which shall have the fewest possible parts consistent with the proper performance of its functions, it being further desired to secure a construction which shall be of such a nature that it shall be inexpensive both to construct and maintain. These objects I attain as hereinafter set forth, reference being had to the accompanying drawings, in which—

Figure 1 is a detached perspective view of my improved clutch, showing the detail construction of its component parts. Fig. 2 is a sectional elevation of the clutch. Fig. 3 is a plan view of one of the members of the clutch. Fig. 4 is a plan view of the pawl member of the clutch. Fig. 5 is a detached perspective view of a slightly-modified form of my invention, and Fig. 6 is a plan view of a special form of the pawl member.

In the drawings, A represents a casing which forms one of the members of the clutch, it being provided with internal ratchet-teeth $a$ and having a recess $a'$ of circular outline in a plane parallel with the plane of said teeth. In the present instance there is a shaft B, fixed to the casing A by means of a key $b$ and extending through the recessed portion $a'$.

The second member of the clutch is shown at C, and it consists, essentially, of a disk-like piece $c$, having a recess (indicated in dotted lines at $c'$ in Fig. 1) for the reception of the end of the shaft B and having attached to or formed integral with it a rearwardly-extending portion $c^2$, which may be attached to or form part of any driving or driven mechanism.

Upon the face of the disk-section $c$ is a projection $c^3$, designed to engage the pawl member D of the clutch, and in Fig. 1 this latter member is shown as consisting of an annular piece having in its periphery a recess $d$ for the reception of the projection $c^3$ and having through it an elongated opening or slot $d'$, although it will be understood that it is immaterial to the operation of the device whether the recess $d$ is in the pawl member D and the projection $c^3$ upon the disk-section $c$, or vice versa. Extending from the periphery of the member D are teeth $d^2$, placed adjacent to the point at which one end of the long axis of the opening $d'$ intersects said periphery. At a point diametrically opposite the recess $d$ and substantially ninety degrees around the periphery of the member D from the teeth $d^2$ is a pin or projection $d^3$, and I preferably make this of such dimensions that its cylindrical surface will be in contact with the internal periphery of the recess $a'$ in the casing A, while not at any time contacting with the shaft B, as shown in Fig. 2.

When the parts of the device are assembled, it will be seen that the pawl member D will lie in the plane of the teeth $c$ of the casing A, although owing to the elongation of the slot or opening $d'$ the teeth of the said member may remain out of contact with the said teeth of the casing. In operation as long as the member C, for instance, is turned by any means in the direction of the arrow $x$ at a higher rate of speed than that at which the member A is turned the projection $c^3$, by bearing against the edge of the recess $d$ in the pawl-piece D farthest from the teeth $d^2$, will turn this piece on the pin or projection $d^3$ as a pivot, moving and holding it in the casing A, so that its teeth $d^2$ will not contact with the internal teeth $a$ of said casing, its motion being limited by the shaft B. When in this position, the member C is free to revolve in the direction shown by the arrow $x$ without affecting in any way or tending to move the member A, and vice versa. Motion of this member in a direction opposite to that of the arrow $x$ will not turn the member C unless the relative direction of rotation of the member C is reversed. The pin $c^3$, bearing against the side of the recess $d$ nearest the teeth $d^2$, will, on the other hand, turn the annular pawl member D on the pin $d^3$ as a pivot and cause its teeth to engage the teeth $a$ of the casing A, with the result that the two members of the clutch are operatively coupled together. This condition continues until the speed of revolution of the part C is diminished or that of the member A is increased, when there will again be movement of the pawl member upon the pin $d^3$, which will cause its teeth to be disengaged from the teeth $a$.

It will be understood that the annular pawl member D while being pivotally mounted upon the member A is perfectly free to rotate within and independent of it as long as its teeth remain out of contact with the teeth $a$, and, although one tendency of the projection $d^3$ is to cause such revolution of the said pawl member, its first and important action is to turn the pawl member on its pivot so that its teeth engage with or disengage from the teeth of the casing.

If desired, to make the pivotal action of the pawl member D more positive a piece E is placed in the recess $a'$ of the casing A, as shown in Fig. 5. The construction of the clutch is the same as that illustrated in Fig. 1, the equivalent of the member C being shown at C' in the form of a toothed wheel for attachment to driving or driven mechanism and a single tooth $d^2$ upon the pawl member D serving to transmit power from said member to the toothed clutch member. One end of the opening $d^4$ through the pawl member is cut away, as shown, and the slotted disk E has been placed in the recess $a'$, the slot $e$ therein being formed for the accommodation of a shaft (not shown) and the pin $d^3$. Since there is relatively considerable friction between the disk E and the interior of the cavity $a'$, its effect upon the pawl member D is to retard the revolution thereof and to cause it to oscillate on the pin $d^3$ as a pivot with comparative freedom.

In Fig. 6 I have illustrated a special form of the pawl member, which is shown therein as being in two pieces D', each having a tooth $d^2$ and a pivotal projection $d^3$. Projections from the clutch member C enter the spaces between the ends of the two pieces, and their action in use is the same as when there is but a single piece to the pawl member. It will be seen that this construction distributes symmetrically the load transmitted by the clutch, while still preserving its simplicity and certainty of action.

It will be understood that it is immaterial which of the clutch members is the driving and which is the driven part, since the device operates equally well irrespective of whether the motive power be applied to the member A or to the member C.

I claim as my invention—

1. The combination in a clutch of two members, with mechanism for operatively connecting the same at will, said mechanism consisting of a single pawl mounted between the clutch members and movable independently of the same, said pawl and one of the clutch members comprising two elements, of which one is provided with a projection extended parallel to the axis of the clutch, the other element having a recess for said projection, with means for operating the pawl, said pawl being supported directly on one of the clutch members independently of the means for connecting said two elements.

2. The combination in a clutch of two members, with a pawl for operatively connecting the same at will, said pawl consisting of a piece free to move bodily between the clutch members and having a permanent, movable connection with one of the same, there being a lateral projection from the pawl and a suitable surface on the second clutch member for said projection whereby the pawl is supported, substantially as described.

3. The combination in a clutch having two members, of which one is provided with teeth, with a pawl constructed to engage said teeth, said pawl being free to move bodily between said two members, one of said members being attached to the pawl by a projection-and-recess connection and said piece being supported directly upon one of the members independently of said connection, substantially as described.

4. The combination of two clutch members with a pawl member provided with a projection, a projection-and-recess connection between one of said members and the pawl member, a tooth or teeth on said pawl member, and teeth on one of the clutch members, said clutch member having a recess for the accommodation of the projection from the pawl member, said projection serving as a pivot for the pawl member while allowing it to revolve independently of the tooth-carrying clutch member, substantially as described.

5. In a clutch, the combination of two members with a pawl member, teeth upon said pawl member and upon one of the clutch members, means for pivotally mounting the pawl member upon one of the clutch members while allowing it to revolve independently thereof, means on the other clutch member for turning said pawl member, said means engaging the pawl member at a point substantially one hundred and eighty degrees from the pivotal point of said member, substantially as described.

6. The combination in a clutch of two members, one having a series of teeth, a pawl mounted between the two clutch members and constructed to engage the toothed member, said pawl being loosely coupled to the other member and having a portion directly contacting with the toothed member and supported thereby, substantially as described.

7. The combination in a clutch of two members, a pawl loosely connected to one of said members and constructed to engage a suitable portion of the second member, said pawl being free to move bodily into and out of engagement with said portion on the second clutch member when impelled by power transmitted through the loose connection from the other member, and being supported directly upon said member, substantially as described.

8. The combination in a clutch with two members of which one is provided with teeth, a pawl member having a tooth or teeth and pivotally mounted upon one of said clutch members but independently revoluble therefrom, with means for retarding such independent revolution, substantially as described.

9. The combination in a clutch of two members of which one is provided with teeth, a substantially cylindrical recess in said toothed member, a pawl member having a tooth or teeth and a projection placed to contact with the internal surface of said recess, and a pin-and-recess connection between the second member of the clutch and the pawl member, substantially as described.

10. The combination in a clutch having two members of which one is provided with teeth, of a pawl member pivotally supported by one of said clutch members while being free to rotate independently thereof, a tooth or teeth upon said pawl member, a projection-and-recess connection between the other member of the clutch and the pawl member, and a revoluble piece in engagement with the pawl member whereby the revolution of said member is retarded, substantially as described.

In testimony whereof I have signed my name to this specification in the presence of two subscribing witnesses.

PAUL A. HOUGHTALING.

Witnesses:
WILLIAM E. BRADLEY,
JOS. H. KLEIN.